(12) United States Patent
Watanabe (10) Patent No.: US 11,760,951 B2
(45) Date of Patent: Sep. 19, 2023

(54) GREASE COMPOSITION, AND LUBRICATION METHOD AND DEVICE FOR SLIDING MECHANISM, USING SAID GREASE COMPOSITION

(71) Applicant: IDEMITSU KOSAN CO., LTD., Chiyoda-ku (JP)

(72) Inventor: Go Watanabe, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 17/435,878

(22) PCT Filed: Feb. 27, 2020

(86) PCT No.: PCT/JP2020/007909
§ 371 (c)(1),
(2) Date: Sep. 2, 2021

(87) PCT Pub. No.: WO2020/179589
PCT Pub. Date: Sep. 10, 2020

(65) Prior Publication Data
US 2022/0145203 A1 May 12, 2022

(30) Foreign Application Priority Data
Mar. 5, 2019 (JP) ................................ 2019-039936

(51) Int. Cl.
*C10M 115/08* (2006.01)
*C10M 133/06* (2006.01)
(Continued)

(52) U.S. Cl.
CPC ........ *C10M 115/08* (2013.01); *C10M 133/06* (2013.01); *C10M 133/16* (2013.01);
(Continued)

(58) Field of Classification Search
USPC .......................................................... 508/522
See application file for complete search history.

(56) References Cited

U.S. PATENT DOCUMENTS

2002/0142920 A1 10/2002 Sugimori et al.
2004/0198617 A1 10/2004 Kinoshita et al.
(Continued)

FOREIGN PATENT DOCUMENTS

CN 1356381 A 7/2002
CN 105008503 A 10/2015
(Continued)

OTHER PUBLICATIONS

International Search Report dated May 26, 2020 in PCT/JP2020/007909 filed on Feb. 27, 2020, 3 pages.
(Continued)

*Primary Examiner* — Prem C Singh
*Assistant Examiner* — Francis C Campanell
(74) *Attorney, Agent, or Firm* — Oblon, McClelland, Maier & Neustadt, L.L.P.

(57) ABSTRACT

The present invention addresses a problem of providing a grease composition containing a urea-based thickener and capable of appropriately maintaining the kinematic friction force in lubrication parts. The grease composition contains a base oil (A) and a urea-based thickener (B), wherein the base oil (A) has a kinematic viscosity at 40° C. of 100 mm²/s or more, and the particles containing the urea-based thickener (B) in the grease composition satisfy the following requirement (I). Requirement (I): the area-based arithmetic average particle diameter of the particles is 2.0 μm or less, as measured by a laser diffraction/scattering method.

13 Claims, 3 Drawing Sheets

(51) Int. Cl.
  *C10M 133/16* (2006.01)
  *C10M 169/02* (2006.01)
  *C10M 169/06* (2006.01)
  *C10N 20/02* (2006.01)
  *C10N 20/06* (2006.01)
  *C10N 30/06* (2006.01)
  *C10N 40/02* (2006.01)
  *C10N 50/10* (2006.01)

(52) U.S. Cl.
  CPC ........ *C10M 169/02* (2013.01); *C10M 169/06* (2013.01); *C10M 2205/0206* (2013.01); *C10M 2215/1026* (2013.01); *C10M 2215/26* (2013.01); *C10M 2215/28* (2013.01); *C10N 2020/02* (2013.01); *C10N 2020/06* (2013.01); *C10N 2030/06* (2013.01); *C10N 2040/02* (2013.01); *C10N 2050/10* (2013.01)

(56) References Cited

U.S. PATENT DOCUMENTS

| | | | |
|---|---|---|---|
| 2009/0247441 A1 | 10/2009 | Baum | |
| 2015/0045273 A1* | 2/2015 | Sekiguchi | C10M 115/08 |
| | | | 508/552 |
| 2016/0002558 A1 | 1/2016 | Takane et al. | |
| 2018/0037842 A1* | 2/2018 | Suetsugu | B01J 19/1806 |
| 2020/0148970 A1* | 5/2020 | Watanabe | C10M 133/06 |

FOREIGN PATENT DOCUMENTS

| | | |
|---|---|---|
| CN | 107207993 A | 9/2017 |
| EP | 3 255 130 A1 | 12/2017 |
| EP | 3 851 506 A1 | 7/2021 |
| EP | 3 919 592 A1 | 12/2021 |
| JP | 11-21580 A | 1/1999 |
| JP | 2006-89575 A | 4/2006 |
| JP | 2009-293042 A | 12/2009 |
| JP | 2010-222516 A | 10/2010 |
| JP | 2010-248442 A | 11/2010 |
| JP | 2010-270864 A | 12/2010 |
| JP | 2015-147867 A | 8/2015 |
| JP | 2016-141805 A | 8/2016 |
| JP | 2017-115109 A | 6/2017 |
| JP | 2017-149905 A | 8/2017 |
| JP | 2017-200981 A | 11/2017 |
| WO | WO 03/006590 A1 | 1/2003 |
| WO | WO 2016/125859 A1 | 8/2016 |
| WO | WO 2017/126703 A1 | 7/2017 |
| WO | WO 2018/092806 A1 | 5/2018 |
| WO | WO 2020/054802 A1 | 3/2020 |
| WO | WO 2020/158907 A1 | 8/2020 |

OTHER PUBLICATIONS

Combined Chinese Office Action and Search Report dated Jun. 15, 2022, in corresponding Chinese Patent Application No. 202080018572.6 (with English Translation and English Translation of Category of Cited Documents), 23 pages.

Lana et al., "Oil Mine Mechanics and Equipment", Petroleum Press, China, 1st Edition, 1st Print, Sep. 1995, p. 40.

Jiang Ming-Jun et al., "Research Development of Low Noise Grease Used in Precision Rolling Bearings", Journal of Logistical Engineering University, vol. 26. No. 5, Sep. 2010, pp. 22-27 (with English Abstract).

Combined Chinese Office Action and Search Report dated Jan. 13, 2023 in Chinese Patent Application No. 202080018572.6 (with unedited computer-generated English Translation), 38 pages.

Extended European Search Report dated Oct. 28, 2022 in European Patent Application No. 20766382.4, 12 pages.

De Laurentis et al., "The influence of bearing grease composition on friction in rolling/sliding concentrated contacts", Tribology International, vol. 94, 2016, pp. 624-632, XP029333739.

De Laurentis et al., "The Influence of Base Oil Properties on the Friction Behaviour of Lithium Greases in Rolling/Sliding Concentrated Contacts", Tribology Letters, vol. 65, 2017, pp. 1-16, XP036307711.

Foreign Office Action dated Jul. 18, 2023, in Japanese Patent Application No. 2021-504006 (with English-Machine Translation).

* cited by examiner

GREASE COMPOSITION, AND LUBRICATION METHOD AND DEVICE FOR SLIDING MECHANISM, USING SAID GREASE COMPOSITION

TECHNICAL FIELD

The present invention relates to a grease composition, and to a method and a device for lubrication for sliding mechanisms using the grease composition.

BACKGROUND ART

As a grease composition, there are mentioned a grease composition using a lithium soap as a thickener (hereinafter also referred to as "a lithium soap grease"), and a grease composition using a urea-based thickener (hereinafter also referred to as "a urea grease"). A lithium soap grease includes those in PTL 1, and a urea grease includes those in PTL 2.

These grease compositions are widely used for increasing the lubricity of lubrication parts in automobiles and machine tools.

For the grease composition for use for automobiles, it is important not to detract from ride quality.

For example, a ball joint is used for jointing a link mechanism of a suspension and for jointing a link mechanism of a steering, and therefore the grease composition for use in the lubrication parts of a ball joint may have a great influence on the ride quality of automobiles.

CITATION LIST

Patent Literature

PTL 1: JP 2010-222516 A
PTL 2: JP 2009-293042 A

SUMMARY OF INVENTION

Technical Problem

A lithium soap grease as in PTL 1 tends to better ride quality as compared with a urea grease. However, a lithium soap grease has an underlying problem that it is poor in heat resistance and oxidation stability.

Since a lithium soap grease has an underlying problem as above, recently, a urea grease improved in ride quality has become desired.

However, in some cases, a urea grease may cause vibration and sound from the lubrication parts of a ball joint, and further could not sufficiently lower the friction in the lubrication parts, that is, the urea grease could not better ride quality as the case may be.

As described above, the conventional urea grease could have good heat resistance and oxidation stability but could not sufficiently lower the kinematic friction force in lubrication parts and, in addition, has a problem that the kinematic friction force may fluctuate.

Given the situation, the present invention addresses a problem of providing a urea-based thickener-containing grease composition capable of appropriately maintaining the kinematic friction force in lubrication parts.

Solution to Problem

The present inventor has made assiduous studies about the kinematic friction force in lubrication parts in using a urea grease. As a result, the inventor has found that the particles contained in a urea grease cause the problem. With that, by controlling the average particle diameter of the particles to fall within a suitable range and by making the base oil have a specific viscosity, the inventor has completed a grease composition capable of suitably maintaining the kinematic friction force in lubrication parts.

Specifically, the present invention relates to the following [1] to [13].

[1] A grease composition containing a base oil (A) and a urea-based thickener (B), wherein the base oil (A) has a kinematic viscosity at 40° C. of 100 mm²/s or more, and the particles containing the urea-based thickener (B) in the grease composition satisfy the following requirement (I).

Requirement (I): the area-based arithmetic average particle diameter of the particles is 2.0 μm or less, as measured by a laser diffraction/scattering method.

[2] The grease composition according to the above [1], wherein the particles containing the urea-based thickener (B) in the grease composition further satisfy the following requirement (II).

Requirement (II): the specific surface area of the particles is $1.0 \times 10^5$ cm²/cm³ or more, as measured by a laser diffraction/scattering method.

[3] The grease composition according to the above [1] or [2], wherein the kinematic viscosity at 40° C. of the base oil (A) is 150 to 700 mm²/s.

[4] The grease composition according to any of the above [1] to [3], wherein the base oil (A) is a mixed base oil of a low-viscosity base oil (A1) having a kinematic viscosity at 40° C. of 10 to 50 mm²/s, a high-viscosity base oil (A2) having a kinematic viscosity at 40° C. of 200 to 700 mm²/s, and an ultrahigh-viscosity base oil (A3) having a kinematic viscosity at 40° C. of 30,000 to 45,000 mm²/s.

[5] The grease composition according to any of the above [1] to [4], wherein the urea-based thickener (B) is a compound represented by the following general formula (b1).

$$R^1\text{---NHCONH---}R^3\text{---NHCONH---}R^2 \quad (b1)$$

In the general formula (b1), $R^1$ and $R^2$ each independently represent a monovalent hydrocarbon group having 6 to 24 carbon atoms, and $R^1$ and $R^2$ may be the same as or different from each other. $R^3$ represents a divalent aromatic hydrocarbon group having 6 to 18 carbon atoms. [6] The grease composition according to the above [5], containing, as the compound represented by the general formula (b1), a compound (b1-1) where $R^1$ and $R^2$ each are a monovalent linear hydrocarbon group having 6 to 24 carbon atoms, a compound (b1-2) where $R^1$ and $R^2$ each are a monovalent alicyclic hydrocarbon group having 6 to 24 carbon atoms, and a compound (b1-3) where $R^1$ is a monovalent linear hydrocarbon group having 6 to 24 carbon atoms and $R^2$ is a monovalent alicyclic hydrocarbon group having 6 to 24 carbon atoms, wherein:

when the content of the compound (b1-1) is defined as α mol %, the content of the compound (b1-2) is as ß mol % and the content of the compound (b1-3) is as γ mol %, (α+γ/2):(ß+γ/2) is 80:20 to 50:50.

[7] The grease composition according to any of the above [1] to [6], wherein the content of the urea-based thickener (B) is 15% by mass or less based on the total amount of the grease composition.

[8] The grease composition according to any of the above [1] to [7], further containing an additive (C) of one or more selected from a sarcosine derivative (C1), an amine compound (C2) and an amide compound (C3).

[9] The grease composition according to any of the above [1] to [8], having a worked penetration of 250 or more.
[10] The grease composition according to any of the above [1] to [9], which is for lubrication for a sliding mechanism of sliding a metal material and a resin material.
[11] A method for lubrication for a sliding mechanism, including adding the grease composition of any of the above [1] to [10] to a sliding mechanism of sliding a metal material and a resin material.
[12] A device having a sliding mechanism of sliding a metal material and a resin material, which is so designed that the grease composition of any of the above [1] to [10] can be supplied to the sliding surface of the sliding mechanism.
[13] The device according to the above [12], wherein the sliding mechanism is a ball joint having a metallic ball stud, a housing, and a resin ball sheet arranged between the ball stud and the housing.

Advantageous Effects of Invention

According to the present invention, there can be provided a grease composition containing an urea-based thickener and capable of suitably maintaining the kinematic friction force in lubrication parts.

DESCRIPTION OF EMBODIMENTS

In the present specification, a lower limit and an upper limit stepwise described for a preferred numerical range (for example, a range of content) can be individually independently combined. For example, from a description of "preferably 10 to 90, more preferably 30 to 60", "a preferred lower limit (10)" and "a more preferred upper limit (60)" can be combined to be "10 to 60".

Also in the present specification, the numerical value in Examples is a numerical value usable as an upper limit or a lower limit.

[Grease Composition]

The grease composition of the present invention is a grease composition containing a base oil (A) and a urea-based thickener (B), wherein the base oil (A) has a kinematic viscosity at 40° C. of 100 mm$^2$/s or more, and the particles containing the urea-based thickener (B) in the grease composition satisfy the following requirement (I).

Requirement (I): the area-based arithmetic average particle diameter of the particles is 2.0 μm or less, as measured by a laser diffraction/scattering method.

<Particle Diameter>

In the grease composition of the present invention, the particles that contain the urea-based thickener (B) in the grease composition need to satisfy the following requirement (I).

Requirement (I): the area-based arithmetic average particle diameter of the particles is 2.0 μm or less, as measured by a laser diffraction/scattering method.

The requirement (I) can be said to be a parameter that indicates the condition of aggregation of the urea-based thickener (B) in the grease composition.

Here, the "particles containing the urea-based thickener (B)" to be a target for measurement according to a laser diffraction/scattering method indicate particles formed by aggregation of the urea-based thickener contained in the grease composition.

In the case where the grease composition contains any other additive than the urea-based thickener (B), the particle diameter defined by the requirement (I) can be determined by measuring a grease composition prepared under the same condition but not adding the additive, according to a laser diffraction/scattering method. However, in the case where the additive is liquid at room temperature (25° C.), a grease composition containing the additive may be employed as a target for measurement.

In the case where the arithmetic average particle diameter is more than 2.0 μm, the kinematic friction force in lubrication parts may increase or the kinematic friction force may fluctuate.

In the grease composition of one embodiment of the present invention, the arithmetic average particle diameter is preferably 1.5 μm or less, more preferably 1.0 μm or less, even more preferably 0.9 μm or less, even more preferably 0.8 μm or less, even more preferably 0.7 μm or less, even more preferably 0.6 μm or less. In general, it is 0.01 μm or more.

<Specific Surface Area>

The grease composition of one embodiment of the present invention is preferably such that the particles containing the urea-based thickener (B) in the grease composition further satisfy the following requirement (II).

Requirement (II): the specific surface area of the particles is 1.0×10$^5$ cm$^2$/cm$^3$ or more, as measured by a laser diffraction/scattering method.

The specific surface area is preferably 1.2×10$^5$ cm$^2$/cm$^3$ or more, more preferably 1.5×10$^5$ cm$^2$/cm$^3$ or more, even more preferably 1.7×10$^5$ cm$^2$/cm$^3$ or more. The specific surface area is generally 1.0×10$^6$ cm$^2$/cm$^3$ or less.

The specific surface area is a sidebar index that indicates the condition of fineness of the particles containing the urea-based thickener (B) and the presence of large particles (lumps) thereof. Specifically, the arithmetic average particle diameter of 2.0 μm or less and the specific surface area falling within the above range indicate that the condition of fineness of the particles containing the urea-based thickener (B) is good and presence of large particles (lumps) is suppressed. Further, a large specific area indicates that the holding power of the particles to hold the base oil (A) is good.

Accordingly, the grease composition of one embodiment of the present invention where the specific surface area falls within the above range can more enhance the effect of making the arithmetic average particle diameter 2.0 μm or more. In addition, the grease composition of one embodiment of the present invention where the specific surface area falls within the above range can readily suppress generation of sound from lubrication parts.

The arithmetic average particle diameter and the specific surface area of the particles that contain the urea-based thickener (B) can be measured, for example, according to the methods described in the section of Examples.

The values of the arithmetic average particle diameter and the specific surface area of the particles that contain the urea-based thickener (B) can be controlled mainly by the controlling the shearing force in production of the grease composition.

Hereinunder while attention is paid to specific means for controlling the arithmetic average particle diameter and the specific surface area, details of the components contained in the grease composition of the present invention are described.

<Base Oil (A)>

The base oil (A) contained in the grease composition of the present invention needs to have a kinematic viscosity at 40° C. of 100 mm$^2$/s or more. The kinematic viscosity at 40° C. of the base oil (A) contained in the grease composition means that of the base oil extracted from the grease composition. In the case where the kinematic viscosity at 40° C. of the base oil (A) is less than 100 mm$^2$/s, the kinematic friction force in lubrication parts may increase and the kinematic friction force may fluctuate.

In the case where the kinematic viscosity at 40° C. of the base oil (A) is too high, a low-temperature torque tends to be high. Accordingly, the kinematic viscosity at 40° C. of the base oil (A) in one embodiment of the present invention is preferably 100 to 1,000 mm$^2$/s, more preferably 130 to 800 mm$^2$/s, even more preferably 150 to 700 mm$^2$/s.

For the base oil (A), any of a mineral oil and a synthetic oil is usable so far as the kinematic viscosity at 40° C. thereof is 100 mm$^2$/s or more. The base oil (A) may be a mixed base oil, and in the case, the kinematic viscosity at 40° C. of the mixed base oil will have to be 100 mm$^2$/s or more.

The mineral oil includes a refined oil prepared by refining a distillate obtained by subjecting a residual oil in atmospheric distillation (an oil having remained in atmospheric distillation of a crude oil, such as a paraffinic crude oil, an intermediate base crude oil or a naphthenic crude oil, followed by extraction of gas, gasoline and kerosene) to reduced-pressure distillation.

Examples of the purification method for obtaining a refined oil include a hydroreforming treatment, a solvent extraction treatment, a solvent dewaxing treatment, a hydroisomerization dewaxing treatment, a hydrorefining treatment, and a clay treatment.

Examples of the synthetic oil include a hydrocarbon-based oil, an aromatic oil, an ester-based oil, and an ether-based oil. In addition, a synthetic oil prepared by isomerizing a wax produced by a Fischer-Tropsch process (GTL wax) is also usable.

Examples of the hydrocarbon-based oil include a poly-α-olefin (PAO), such as normal paraffin, isoparaffin, polybutene, polyisobutylene, a 1-decene oligomer, and a cooligomer of 1-decene and ethylene; and a hydrogenated product thereof.

Examples of the aromatic oil include an alkylbenzene such as a monoalkylbenzene, and a dialkylbenzene; and an alkylnaphthalene such as a monoalkylnaphthalene, a dialkylnaphthalene, and a polyalkylnaphthalenes.

Examples of the ester-based oil include a diester-based oil, such as dibutyl sebacate, di-2-ethylhexyl sebacate, dioctyl adipate, diisodecyl adipate, ditridecyl adipate, ditridecyl glutarate, and methyl acetyl ricinolate; an aromatic ester-based oil, such as trioctyl trimellitate, tridecyl trimellitate, and tetraoctyl pyromellitate; a polyol ester-based oil, such as trimethylolpropane caprylate, trimethylolpropane pelargonate, pentaerythritol-2-ethylhexanoate, and pentaerythritol pelargonate; and a complex ester-based oil, such as an oligoester of a polyhydric alcohol with a mixed fatty acid of a dibasic acid and a monobasic acid.

Examples of the ether-based oil include a polyglycol, such as polyethylene glycol, polypropylene glycol, polyethylene glycol monoether, and polypropylene glycol monoether; and a phenyl ether-based oil, such as a monoalkyl triphenyl ether, an alkyl diphenyl ether, a dialkyl diphenyl ether, pentaphenyl ether, tetraphenyl ether, a monoalkyl tetraphenyl ether, and a dialkyl tetraphenyl ether.

Here, in the case where the grease composition is required to have oxidation stability at high temperatures, a synthetic oil is preferably used, and one or more selected from a hydrocarbon-based oil, an ester-based oil, and an ether-based oil are more preferably used. Using a hydrocarbon-based oil, an ester-based oil and an ether-based oil as mixed, a balance of heat resistance, sealing resistance and low-temperature characteristics can be secured.

The base oil (A) in one embodiment of the present invention is preferably a mixed base oil of a low-viscosity base oil (A1) having a kinematic viscosity at 40° C. of 10 to 50 mm$^2$/s, a high-viscosity base oil (A2) having a kinematic viscosity at 40° C. of 200 to 700 mm$^2$/s, and an ultrahigh-viscosity base oil (A3) having a kinematic viscosity at 40° C. of 30,000 to 45,000 mm$^2$/s.

The kinematic viscosity at 40° C. of the low-viscosity base oil (A1) is preferably 15 to 45 mm$^2$/s, more preferably 20 to 40 mm$^2$/s.

The kinematic viscosity at 40° C. of the high-viscosity base oil (A2) is preferably 250 to 600 mm$^2$/s, more preferably 300 to 500 mm$^2$/s.

The kinematic viscosity at 40° C. of the ultrahigh-viscosity base oil (A3) is preferably 32,000 to 43,000 mm$^2$/s, more preferably 35,000 to 40,000 mm$^2$/s.

The content of the low-viscosity base oil (A1), based on the total amount (100% by mass) of the total content of the low-viscosity base oil (A1), the high-viscosity base oil (A2) and the ultrahigh-viscosity base oil (A3), is preferably 20 to 55% by mass, more preferably 25 to 45% by mass, even more preferably 30 to 40% by mass.

The content of the high-viscosity base oil (A2), based on the total amount (100% by mass) of the total content of the low-viscosity base oil (A1), the high-viscosity base oil (A2) and the ultrahigh-viscosity base oil (A3), is preferably 40 to 75% by mass, more preferably 45 to 70% by mass, even more preferably 50 to 60% by mass.

The content of the ultrahigh-viscosity base oil (A3), based on the total amount (100% by mass) of the total content of the low-viscosity base oil (A1), the high-viscosity base oil (A2) and the ultrahigh-viscosity base oil (A3), is preferably 1 to 25% by mass, more preferably 2 to 20% by mass, even more preferably 3 to 18% by mass.

In the case of the mixed base oil mentioned above, preferably, the low-viscosity base oil (A1), the high-viscosity base oil (A2) and the ultrahigh-viscosity base oil (A3) are similar to each other in point of the composition. For example, the low-viscosity base oil (A1), the high-viscosity base oil (A2) and the ultrahigh-viscosity base oil (A3) are all preferably hydrocarbon-based synthetic oils, more preferably poly-α-olefins or hydrides thereof.

In the case where the low-viscosity base oil (A1), the high-viscosity base oil (A2) and the ultrahigh-viscosity base oil (A3) are all poly-α-olefins or hydrides thereof, the viscosity of the poly-α-olefin can be controlled by the weight-average molecular weight thereof. In the present specification, the weight-average molecular weight means a standard polystyrene-equivalent molecular weight determined through gel permeation chromatography (GPC).

The viscosity index of the base oil (A) used in one embodiment of the present invention is preferably 60 or more, more preferably 80 or more, even more preferably 100 or more.

In the present specification, the kinematic viscosity and the viscosity index each mean a value measured or calculated according to JIS K2283:2000.

In the grease composition of one embodiment of the present invention, the content of the base oil (A) is, based on the total amount (100% by mass) of the grease composition, preferably 50% by mass or more, more preferably 55% by mass or more, even more preferably 60% by mass or more, further more preferably 65% by mass or more, and is preferably 98.5% by mass or less, more preferably 97% by mass or less, even more preferably 95% by mass or less, further more preferably 93% by mass or less.

<Urea-Based Thickener (B)>

The grease composition of the present invention contains the urea-based thickener (B) as a thickener. Not containing the urea-based thickener (B), the composition cannot have good heat resistance and oxidation stability.

The content of the urea-based thickener (B) is, based on the total amount (100% by mass) of the thickener in the composition, 50% by mass or more, more preferably 70% by mass or more, even more preferably 90% by mass or more, even more preferably 95% by mass or more, even more preferably 100% by mass.

The urea-based thickener (B) contained in the grease composition of the present invention may be a compound having a urea bond, and is preferably a diurea compound having 2 urea bonds, more preferably a diurea compound represented by the following general formula (b1).

$$R^1\text{—NHCONH—}R^3\text{—NHCONH—}R^2 \quad (b1)$$

In the general formula (b1), $R^1$ and $R^2$ each independently represent a monovalent hydrocarbon group having 6 to 24 carbon atoms, and $R^1$ and $R^2$ may be the same as or different from each other. $R_3$ represents a divalent aromatic hydrocarbon group having 6 to 18 carbon atoms.

The urea-based thickener (B) for use in one embodiment of the present invention may be one kind, or may be a mixture of two or more kinds.

The carbon number of the monovalent hydrocarbon group that can be selected for $R^1$ and $R^2$ in the general formula (b1) is 6 to 24, preferably 6 to 20, more preferably 6 to 18.

The monovalent hydrocarbon group that can be selected for $R^1$ and $R^2$ includes a monovalent linear hydrocarbon group, a monovalent alicyclic hydrocarbon group, and a monovalent aromatic hydrocarbon group. Among these, a monovalent linear hydrocarbon group and a monovalent alicyclic hydrocarbon group are preferred. The monovalent linear hydrocarbon group and the monovalent alicyclic hydrocarbon group may be saturated or unsaturated.

One preferred embodiment of the compound represented by the general formula (b1) contains a compound (b1-1) where $R^1$ and $R^2$ each are a monovalent linear hydrocarbon group having 6 to 24 carbon atoms, a compound (b1-2) where $R^1$ and $R^2$ each are a monovalent alicyclic hydrocarbon group having 6 to 24 carbon atoms, and a compound (b1-3) where $R^1$ is a monovalent linear hydrocarbon group having 6 to 24 carbon atoms and $R^2$ is a monovalent alicyclic hydrocarbon group having 6 to 24 carbon atoms, wherein, when the content of the compound (b1-1) is defined as α mol %, the content of the compound (b1-2) is as β mol % and the content of the compound (b1-3) is as γ mol %, (α+γ/2):(β+γ/2) is 80:20 to 50:50.

In the compound represented by the general formula (b1), when the linear hydrocarbon group of $R^1$ and $R^2$ is controlled to account for a predetermined ratio or more, the grease composition can be smoothed to readily reduce friction. The effect is effective especially in the case where a resin material is used in lubrication parts such as slide parts. Also in the compound represented by the general formula (b1), when the alicyclic hydrocarbon group of $R^1$ and $R^2$ is controlled to account for a predetermined ratio or more and when a metal material is used in lubrication parts such as slide parts, the grease composition can be readily made to remain in lubrication parts to thereby better wear resistance. Consequently, by controlling the above ratio (α+γ/2):(β+γ/2) to fall within the above range, excellent ride quality can be maintained readily for long. The effect is especially effective for sliding mechanisms where a metal material and a resin material slide to each other.

The ratio (α+γ/2):(β+γ/2) is more preferably 70/30 to 50/50, even more preferably 63/35 to 55/45.

As the monovalent saturated chain hydrocarbon group, there is exemplified a linear or branched alkyl group having 6 to 24 carbon atoms. Specifically, examples thereof include a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, an octadecenyl group, a nonadecyl group, and an eicosyl group.

As the monovalent unsaturated chain hydrocarbon group, there is exemplified a linear or branched alkenyl group having 6 to 24 carbon atoms. Specifically, examples thereof include a hexenyl group, a heptenyl group, an octenyl group, a nonenyl group, a decenyl group, a dodecenyl group, a tridecenyl group, a tetradecenyl group, a pentadecenyl group, a hexadecenyl group, an octadecenyl group, a nonadecenyl group, an eicosenyl group, an oleyl group, a geranyl group, a farnesyl group, and a linoleyl group.

The monovalent saturated chain hydrocarbon group and the monovalent unsaturated chain hydrocarbon group each may be a linear chain or a branched chain.

Examples of the monovalent saturated alicyclic hydrocarbon group include a cycloalkyl group, such as a cyclohexyl group, a cycloheptyl group, a cyclooctyl group, and a cyclononyl group; and a cycloalkyl group substituted with an alkyl group having 1 to 6 carbon atoms (preferably a cyclohexyl group substituted with an alkyl group having 1 to 6 carbon atoms), such as a methylcyclohexyl group, a dimethylcyclohexyl group, an ethylcyclohexyl group, a diethylcyclohexyl group, a propylcyclohexyl group, an isopropylcyclohexyl group, a 1-methyl-propylcyclohexyl group, a butylcyclohexyl group, a pentylcyclohexyl group, a pentyl-methylcyclohexyl group, and a hexylcyclohexyl group.

Examples of the monovalent unsaturated alicyclic hydrocarbon group include a cycloalkenyl group, such as a cyclohexenyl group, a cycloheptenyl group, and a cyclooctenyl group; and a cycloalkenyl group substituted with an alkyl group having 1 to 6 carbon atoms (preferably a cyclohexenyl group substituted with an alkyl group having 1 to 6 carbon atoms), such as a methylcyclohexenyl group, a dimethylcyclohexenyl group, an ethylcyclohexenyl group, a diethylcyclohexenyl group, and a propylcyclohexenyl group.

Examples of the monovalent aromatic hydrocarbon group include a phenyl group, a biphenyl group, a terphenyl group, a naphthyl group, a diphenylmethyl group, a diphenylethyl group, a diphenylpropyl group, a methylphenyl group, a dimethylphenyl group, an ethylphenyl group, and a propylphenyl group.

Although the carbon number of the divalent aromatic hydrocarbon group which can be selected as Ra in the general formula (b1) is 6 to 18, it is preferably 6 to 15, and more preferably 6 to 13.

Examples of the divalent aromatic hydrocarbon group which can be selected as $R^3$ include a phenylene group, a diphenylmethylene group, a diphenylethylene group, a diphenylpropylene group, a methylphenylene group, a dimethylphenylene group, and an ethylphenylene group.

Of these, a phenylene group, a diphenylmethylene group, a diphenylethylene group, or a diphenylpropylene group is preferred, and a diphenylmethylene group is more preferred.

In the grease composition of one embodiment of the present invention, the content of the thickener (B) is, based on the total amount (100% by mass) of the grease composition, preferably 15% by mass or less, more preferably 12% by mass or less, even more preferably 10% by mass or less, and is preferably 1% by mass or more, more preferably 2% by mass or more, even more preferably 3% by mass or more.

When the content of the thickener (B) falls within the above range, the worked penetration of the grease composition can be readily controlled to fall within a suitable range.

<Production Method for Urea-Based Thickener (B)-Containing Grease Composition>

The urea-based thickener (B) can be produced generally by reacting an isocyanate compound and a monoamine. The reaction is preferably according to a method of adding a solution (y) prepared by dissolving a monoamine in the base oil (A) to a hot solution (x) prepared by dissolving an isocyanate compound to the base oil (A).

For example, in the case where a compound represented by the general formula (b1) is produced, a diisocyanate having a group that corresponds to the divalent aromatic hydrocarbon group represented by $R^3$ in the general formula (b1) is used as an isocyanate compound and an amine having a group that corresponds to the monovalent hydrocarbon group represented by $R^1$ and $R^2$ is used as a monoamine, and according to the above-mentioned method, a desired urea-based thickener (B) is synthesized.

From the viewpoint of finely pulverizing the particles containing the urea-based thickener (B) in the grease composition, it is preferred to produce the grease composition using a grease manufacturing apparatus as expressed in the following [1].

[1] A grease manufacturing apparatus including a container body having an introduction portion into which a grease raw material is introduced and a discharge portion for discharging the grease into the outside; and a rotor having a rotation axis in an axial direction of the inner periphery of the container body and rotatably provided in the inside of the container body, the rotor including a first concave-convex portion in which (i) concave and convex are alternately provided along the surface of the rotor, the concave and convex being inclined to the rotation axis, and (ii) a feeding ability from the introduction portion to a direction of the discharge portion is provided.

While the grease manufacturing apparatus as set forth in the above [1] is hereunder described, the term "preferred" prescribed below is an embodiment from the viewpoint of finely pulverizing the particles containing the urea-based thickener (B) in the grease composition, unless otherwise specifically indicated.

Figure 2:
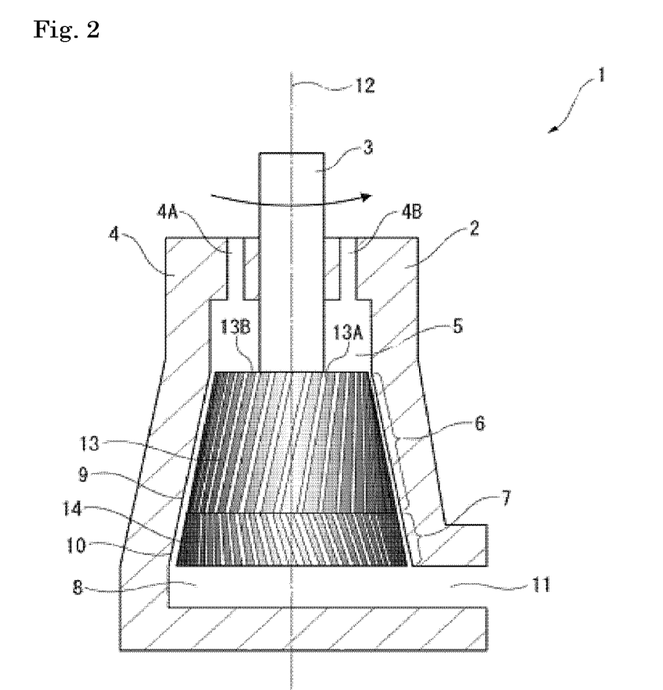
FIG. 2 is a schematic view of a cross section of a grease manufacturing apparatus, used in one embodiment of the present invention.

FIG. 2 is a schematic cross-sectional view of the grease manufacturing apparatus as set forth in the above [1] that can be used in one embodiment of the present invention.

A grease manufacturing apparatus 1 shown in FIG. 2 includes a container body 2 for introducing a grease raw material into the inside thereof; and a rotor 3 having a rotation axis 12 on a central axis line of an inner periphery of the container body 2 and rotating around the rotation axis 12 as a center axis.

The rotor 3 rotates at high speed around the rotation axis 12 as a center axis to apply a high shearing force to a grease raw material inside the container body 2. Thus, the grease containing the urea-based thickener is produced.

As shown in FIG. 2, the container body 2 is preferably partitioned to an introduction portion 4, a retention portion 5, a first inner peripheral surface 6, a second inner peripheral surface 7, and a discharge portion 8 in this order from an upstream side.

As shown in FIG. 2, it is preferred that the container body 2 has an inner peripheral surface forming such a truncated cone shape that an inner diameter thereof gradually increases from the introduction portion 4 toward the discharge portion 8.

The introduction portion 4 serving as one end of the container body 2 is provided with a plurality of solution introducing pipes 4A and 4B for introducing a grease raw material from the outside of the container body 2.

The retention portion 5 is disposed in a downstream portion of the introduction portion 4, and is a space for temporarily retaining the grease raw material introduced from the introduction portion 4. When the grease raw material is retained in the retention portion 5 for a long time, grease adhered to the inner peripheral surface of the retention portion 5 forms a large lump, so that it is preferred to transport the grease raw material to the first inner peripheral surface 6 in the downstream side in a short time as far as possible. More preferably, it is preferred to transport the grease raw material directly to the first inner peripheral surface 6 without passing through the retention portion 5.

The first inner peripheral surface 6 is disposed in a downstream portion adjacent to the retention portion 5, and the second inner peripheral surface 7 is disposed in a downstream portion adjacent to the first inner peripheral surface 6. As mentioned later in detail, it is preferred to provide a first concave-convex portion 9 on the first inner peripheral surface 6 and to provide a second concave-convex portion 10 on the second inner peripheral surface 7, for the purpose of allowing the first inner peripheral surface 6 and the second inner peripheral surface 7 to function as a high shearing portion for imparting a high shearing force to the grease raw material or grease.

The discharge portion 8 serving as the other end of the container body 2 is a part for discharging the grease agitated on the first inner peripheral surface 6 and the second inner peripheral surface 7, and is provided with a discharge port 11 for discharging grease. The discharge port 11 is formed in a direction orthogonal or approximately orthogonal to the rotation axis 12. According to this, the grease is discharged from the discharge port 11 to the direction orthogonal or approximately orthogonal to the rotation axis 12. However, the discharge port 11 does not necessarily have to be made orthogonal to the rotation axis 12, and may be formed in a direction parallel or approximately parallel to the rotation axis 12.

The rotor 3 is rotatably provided on the center axis line of the inner peripheral surface of the container body 2, which has a truncated cone shape, as a rotation axis 12, and rotates counterclockwise when the container body 2 is viewed from the upstream portion to the downstream portion as shown in FIG. 2.

The rotor 3 has an outer peripheral surface that expands in accordance with the enlargement of the inner diameter of the truncated cone of the container body 2, and the outer peripheral surface of the rotor 3 and the inner peripheral surface of the truncated cone of the container body 2 are maintained at a constant interval.

On the outer peripheral surface of the rotor 3, a first concave-convex portion 13 of the rotor in which concave and convex are alternately provided along the surface of the rotor 3 is provided.

The first concave-convex portion 13 of the rotor is inclined to the rotation axis 12 of the rotor 3 in the direction of from the introduction portion 4 to the discharge portion 8, and has a feeding ability in the direction of from the introduction portion 4 to the discharge portion 8. That is, the first concave-convex portion 13 of the rotor is inclined in the direction in which the solution is pushed toward the downstream side when the rotor 3 rotates in the direction shown in FIG. 2.

A step difference between a concave portion 13A and a convex portion 13B of the first concave-convex portion 13 of the rotor is preferably 0.3 to 30, more preferably 0.5 to 15, and still more preferably 2 to 7, when the diameter of the concave portion 13A on the outer peripheral surface of the rotor 3 is 100.

The number of convex portions 13B of the first concave-convex portion 13 of the rotor in the circumferential direction is preferably 2 to 1,000, more preferably 6 to 500, and still more preferably 12 to 200.

A ratio of the width of the convex portion 13B to the width of the concave portion 13A of the first concave-convex portion 13 of the rotor [(width of the convex portion)/(width of the concave portion)] in the cross section orthogonal to the rotation axis 12 of the rotor 3 is preferably 0.01 to 100, more preferably 0.1 to 10, and still more preferably 0.5 to 2.

An inclination angle of the first concave-convex portion 13 of the rotor with respect to the rotation axis 12 is preferably 2 to 85°, more preferably 3 to 45°, and still more preferably 5 to 20°.

It is preferred that the first inner peripheral surface 6 of the container body 2 is provided with the first concave-convex portion 9 formed with a plurality of concave and convex along the inner peripheral surface thereof.

It is preferred that the concave and convex of the first concave-convex portion 9 on the side of the container body 2 are inclined in the opposite direction to the first concave-convex portion 13 of the rotor.

That is, it is preferred that the plurality of concave and convex of the first concave-convex portion 9 on the side of the container body 2 be inclined in the direction in which the solution is pushed toward the downstream side when the rotation axis 12 of the rotor 3 rotates in the direction shown in FIG. 2. The stirring ability and the discharge ability are further enhanced by the first concave-convex portion 9 having a plurality of concave and convex provided on the first inner peripheral surface 6 of the container body 2.

A depth of the concave and convex of the first concave-convex portion 9 on the side of the container body 2 is preferably 0.2 to 30, more preferably 0.5 to 15, and still more preferably 1 to 5, when the inner diameter (diameter) of the container is set to 100.

The number of concave and convex of the first concave-convex portion 9 on the side of the container body 2 is preferably 2 to 1,000, more preferably 6 to 500, and still more preferably 12 to 200.

A ratio of the width of the concave portion to the width of the convex portion between grooves in the concave and convex of the first concave-convex portion 9 on the side of the container body 2 [(width of the concave portion)/(width of the convex portion)] is preferably 0.01 to 100, more preferably 0.1 to 10, and still more preferably 0.5 to 2 or less.

An inclination angle of the concave and convex of the first concave-convex portion 9 on the side of the container body 2 to the rotation axis 12 is preferably 2 to 85°, more preferably 3 to 45°, and still more preferably 5 to 20°.

By providing the first concave-convex portion 9 on the first inner peripheral surface 6 of the container body 2, the first inner peripheral surface 6 can be made to function as a shearing portion for imparting a high shearing force to the grease raw material or grease, but the first concave-convex portion 9 does not necessarily have to be provided.

It is preferred that a second concave-convex portion 14 of a rotor having concave and convex alternately provided along the surface of the rotor 3 is provided on the outer peripheral surface of the downstream portion of the first concave-convex portion 13 of the rotor.

The second concave-convex portion 14 of the rotor is inclined to the rotation axis 12 of the rotor 3, and has a feeding suppression ability to push the solution back toward the upstream side from the introduction portion 4 toward the discharge portion 8.

A step difference of the second concave-convex portion 14 of the rotor is preferably 0.3 to 30, more preferably 0.5 to 15, and still more preferably 2 to 7, when the diameter of the concave portion of the outer peripheral surface of the rotor 3 is set to 100.

The number of convex portions of the second concave-convex portion 14 of the rotor in the circumferential direction is preferably 2 to 1,000, more preferably 6 to 500, and still more preferably 12 to 200.

A ratio of the width of the convex portion to the width of the concave portion of the second concave-convex portion 14 of the rotor in a cross section orthogonal to the rotation axis of the rotor 3 [(width of the convex portion)/(width of the concave portion)] is preferably 0.01 to 100, more preferably 0.1 to 10, and still more preferably 0.5 to 2.

An inclination angle of the second concave-convex portion 14 of the rotor to the rotation axis 12 is preferably 2 to 85°, more preferably 3 to 45°, and still more preferably 5 to 20°.

It is preferred that the second inner peripheral surface 7 of the container body 2 is provided with the second concave-convex portion 10 formed with a plurality of concave and convex adjacent to the downstream portion of the concave and convex in the first concave-convex portion 9 on the side of the container body 2.

It is preferred that the plurality of concave and convex are formed on the inner peripheral surface of the container body 2, and that the concave and convex are inclined in opposite directions to the inclination direction of the second concave-convex portion 14 of the rotor.

That is, it is preferred that the plurality of concave and convex of the second concave-convex portion 10 on the side of the container body 2 are inclined in the direction in which the solution is pushed back toward the upstream side when the rotation axis 12 of the rotor 3 rotates in the direction shown in FIG. 2. A stirring ability is more enhanced by the concave and convex of the second concave-convex portion 10 provided on the second inner peripheral surface 7 of the container body 2. In addition, the second inner peripheral surface 7 of the container body can function as a shearing portion which imparts a high shearing force to the grease raw material or grease.

A depth of the concave portion of the second concave-convex portion 10 on the side of the container body 2 is preferably 0.2 to 30, more preferably 0.5 to 15, and still more preferably 1 to 5, when the inner diameter (diameter) of the container body 2 is set to 100.

The number of concave portions of the second concave-convex portion 10 on the side of the container body 2 is preferably 2 to 1,000, more preferably 6 to 500, and still more preferably 12 to 200.

A ratio of the width of the convex portion of the concave and convex of the second concave-convex portion 10 on the side of the container body 2 to the width of the concave portion in the cross section orthogonal to the rotation axis 12 of the rotor 3 [(width of the convex portion)/(width of the concave portion)] is preferably 0.01 to 100, more preferably 0.1 to 10, and still more preferably 0.5 to 2 or less.

An inclination angle of the second concave-convex portion 10 on the side of the container body 2 to the rotation axis 12 is preferably 2 to 85°, more preferably 3 to 45°, and still more preferably 5 to 20°.

A ratio of the length of the first concave-convex portion 9 on the side of the container body 2 to the length of the second concave-convex portion 10 on the side of the container body 2 [(length of the first concave-convex portion)/(length of the second concave-convex portion)] is preferably 2/1 to 20/1.

Figure 3:
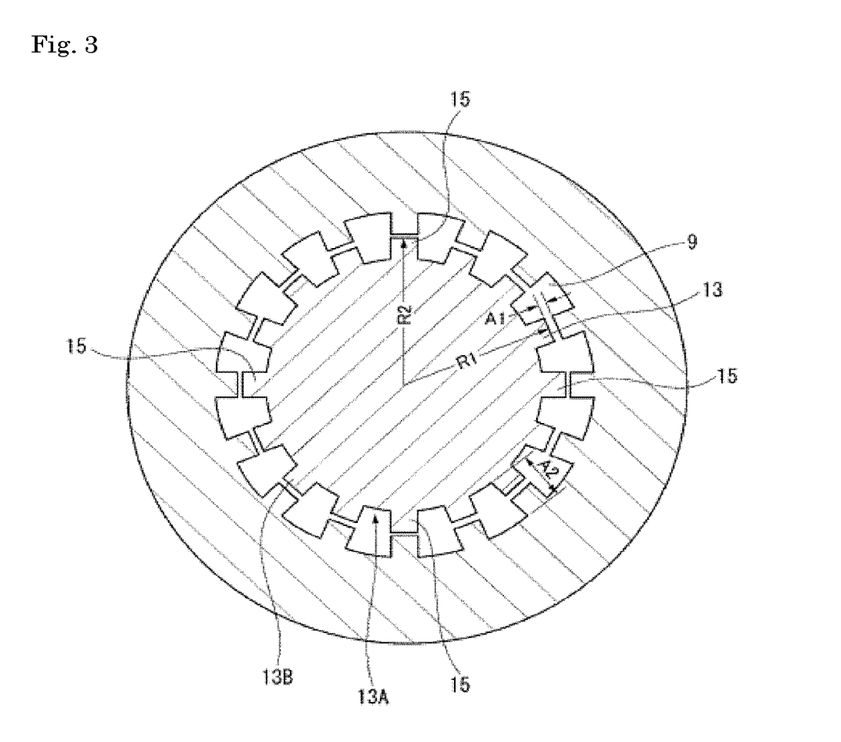
FIG. 3 is a schematic view of a cross section in the direction orthogonal to a rotation axis in a first concave-convex portion on the side of a container body of the grease manufacturing apparatus of FIG. 2.

FIG. 3 is a cross-sectional view of the direction orthogonal to the rotation axis 12 in the first concave-convex portion 9 on the side of the container body 2 of the grease manufacturing apparatus 1.

In the first concave-convex portion 13 of the rotor shown in FIG. 3, a plurality of scrapers 15 each having a tip protruding toward the inner peripheral surface side of the container body 2 beyond the tip in the projecting direction of the convex portion 13B of the first concave-convex portion 13 are provided. In addition, though not shown, the second concave-convex portion 14 is also provided with a plurality of scrapers in which the tip of the convex portion protrudes toward the inner peripheral surface side of the container body 2, similarly to the first concave-convex portion 13.

The scraper 15 scrapes off the grease adhered to the inner peripheral surface of the first concave-convex portion 9 on the side of the container body 2 and the second concave-convex portion 10 on the side of the container body 2.

With respect to the protrusion amount of the tip of the scraper 15 relative to the projecting amount of the convex portion 13B of the first concave-convex portion 13 of the rotor, a ratio [R2/R1] of the radius (R2) of the tip of the scraper 15 to the radius (R1) of the tip of the convex portion 13B is preferably more than 1.005 and less than 2.0.

The number of scrapers 15 is preferably 2 to 500, more preferably 2 to 50, and still more preferably 2 to 10.

In the grease manufacturing apparatus 1 shown in FIG. 3, the scraper 15 is provided, but may not be provided, or may be provided intermittently.

In order to produce the grease containing the urea-based thickener (B) by the grease manufacturing apparatus 1, the solution (x) and the solution (y) which are the aforementioned grease raw materials are introduced respectively from the solution introducing pipes 4A and 4B of the introduction portion 4 of the container body 2, and the rotor 3 is rotated at a high speed, whereby the grease base material containing the urea-based thickener (B) can be produced.

Then, even by blending the additive (C) with the thus-prepared grease base material, the urea-based thickener (B) in the grease composition can be finely pulverized so that the arithmetic average particle diameter can fall within the above-mentioned range.

As a high-speed rotation condition of the rotor 3, a shear rate applied to the grease raw material is preferably $10^2$ s$^{-1}$ or more, more preferably $10^3$ s$^{-1}$ or more, and still more preferably 104 s$^{-1}$ or more, and it is typically 107 s$^{-1}$ or less.

A ratio of a maximum shear rate (Max) to a minimum shear rate (Min) in the shearing at the time of high-speed rotation of the rotor 3 (Max/Min) is preferably 100 or less, more preferably 50 or less, and still more preferably 10 or less.

The shear rate to the mixed solution is as uniform as possible, thereby the urea-based thickener and a precursor thereof in the grease composition can be more readily pulverized into fine particles, and a more uniform grease structure can be thus obtained.

Here, the maximum shear rate (Max) is a highest shear rate applied to the mixed solution, and the minimum shear rate (Min) is a lowest shear rate applied to the mixed solution, which are defined as follows.

Maximum shear rate (Max)=(linear velocity at the tip of the convex portion 13B of the first concave-convex portion 13 of the rotor)/(gap A1 between the tip of the convex portion 13B of the first concave-convex portion 13 of the rotor and the convex portion of the first concave-convex portion 9 of the first inner peripheral surface 6 of the container body 2)

Minimum shear rate (Min)=(linear velocity of the concave portion 13A of the first concave-convex portion 13 of the rotor)/(gap A2 between the concave portion 13A of the first concave-convex portion 13 of the rotor and the concave portion of the first concave-convex portion 9 on the first inner peripheral surface 6 of the container body 2)

The gap A1 and the gap A2 are as shown in FIG. 3.

The grease manufacturing apparatus 1 is provided with the scraper 15, thereby grease adhered to the inner peripheral surface of the container body 2 can be scraped off, so that the generation of the lumps during kneading can be prevented, and the grease in which the urea-based thickener is finely dispersed can be continuously produced in a short time.

In view of the fact that the scraper 15 scrapes off the grease adhered thereto, it is possible to prevent the retained grease from becoming a resistance to rotation of the rotor 3, so that the rotational torque of the rotor 3 can be reduced, and the power consumption of the drive source can be reduced, thereby making it possible to continuously produce the grease efficiently.

Since the inner peripheral surface of the container body 2 is in a shape of a truncated cone whose inner diameter increases from the introduction portion 4 toward the discharge portion 8, the centrifugal force has an effect for discharging the grease or grease raw material in the downstream direction, and the rotation torque of the rotor 3 can be reduced to continuously produce the grease.

Since the first concave-convex portion 13 of the rotor is provided on an outer peripheral surface of the rotor 3, the first concave-convex portion 13 of the rotor is inclined to the rotation axis 12 of the rotor 3, the first concave-convex portion 13 has a feeding ability from the introduction portion 4 to the discharge portion 8, the second concave-convex portion 14 of the rotor is inclined to the rotation axis 12 of the rotor 3, and the second concave-convex portion 14 has a feeding suppression ability from the introduction portion 4 to the discharge portion 8, a high shear force can be given to the solution, and even after blending with the additive, the particles that contain the urea-based thickener (B) in the grease composition can be finely pulverized.

Since the first concave-convex portion 9 is formed on the first inner peripheral surface 6 of the container body 2 and is inclined in the opposite direction to the first concave-convex portion 13 of the rotor, in addition to the effect of the first concave-convex portion 13 of the rotor, sufficient stirring of grease raw material can be carried out while extruding the grease or grease raw material in the downstream direction. Consequently, even after blending with the additive, the particles that contain the urea-based thickener (B) in the grease composition can be finely pulverized.

The second concave-convex portion 10 is provided on the second inner peripheral surface 7 of the container body 2, and the second concave-convex portion 14 of the rotor is provided on the outer peripheral surface of the rotor 3, thereby the grease raw material can be prevented from flowing out from the first inner peripheral surface 6 of the container body more than necessary. Consequently, the particles that contain the urea-based thickener (B) can also be finely pulverized even after blending with the additive by giving a high shear force to the solution to highly disperse the grease raw material.

<Additive (C)>

The grease composition of one embodiment of the present invention preferably contains one or more additives selected from a sarcosine derivative (C1), an amine compound (C2), and an amide compound (C3). More preferably, the grease composition contains two or more selected from a sarcosine derivative (C1), an amine compound (C2) and an amide compound (C3), as in the following (1) to (4), and even more preferably contains three of a sarcosine derivative (C1), an amine compound (C2) and an amide compound (C3) as in the following (4).

(1) An embodiment containing two of a sarcosine derivative (C1) and an amine compound (C2).
(2) An embodiment containing two of a sarcosine derivative (C1) and an amide compound (C3).
(3) An embodiment containing two of an amine compound (C2) and an amide compound (C3).
(4) An embodiment containing three of a sarcosine derivative (C1), an amine compound (C2) and an amide compound (C3).

Containing the additive (C) of one or more selected from a sarcosine derivative (C1), an amine compound (C2), and an amide compound (C3), the wear resistance of the grease composition can be bettered more. In particular, when used for lubrication for slide parts composed of a metal material and a resin material, the grease composition is greatly effective for improving the wear resistance of the resin material, and further, in the case where the slide speed is low or where the load given to the slide parts is relatively large, the effect of improving the wear resistance of the resin material can be enhanced.

In one embodiment of the present invention, the content of the component (C) is preferably 0.1 to 10.0% by mass, more preferably 1.0 to 8.0% by mass, still more preferably 3.0 to 6.0% by mass, on a basis of the total amount (100% by mass) of the grease composition.

«Sarcosine Derivative (C1)»

The sarcosine derivative (C1) is an α-amino acid in which a secondary or tertiary amino group having a methyl group is bound to a carbon atom having a carboxy group bound thereto and may be N-methylglycine or an aliphatic amino acid having an N-methylglycine structure.

Examples of the sarcosine derivative (C1) include N-oleylsarcosine, N-stearoylsarcosine, N-lauroylsarcosine, N-myristoylsarcosine and N-palmitoylsarcosine.

These sarcosine derivatives (C1) may be used alone or may be used in combination of two or more thereof.

The sarcosine derivative (C1) is preferably a compound represented by the following general formula (c-1).

(c-1)

In the general formula (c-1), R is an alkyl group having 1 to 30 carbon atoms or an alkenyl group having 1 to 30 carbon atoms.

Although the carbon number of the alkyl group and the alkenyl group of R in the formula (c-1) is 1 to 30, it is preferably 6 to 27, more preferably 10 to 24, and still more preferably 12 to 20. The alkyl group may be a linear alkyl group or may be a branched alkyl group. The alkenyl group may be a linear alkenyl group or may be a branched alkenyl group.

As the sarcosine derivative (C1), N-oleylsarcosine is preferred.

«Amine Compound (C2)»

The amine compound (C2) which is used in the present invention may be a compound having an amino group, and examples thereof include a monoamine, a diamine, and a triamine.

The amine compound (C2) may be used alone or may be used in combination of two or more thereof.

Of these, the amine compound (C2) which is used in one embodiment of the present invention is preferably a monoamine, and more preferably an aliphatic monoamine.

Examples of the aliphatic monoamine which is used in one embodiment of the present invention include a primary aliphatic monoamine represented by the following general formula (c2-i), a secondary aliphatic monoamine represented by the following general formula (c2-ii), and a tertiary aliphatic monoamine represented by the following general formula (c2-iii).

(c2-i)

(c2-ii)

(c2-iii)

In the general formulae (c2-i) to (2c-iii), $R^1$ to $R^3$ are each independently an alkyl group or an alkenyl group, and preferably an alkenyl group.

The carbon number of the alkyl group and the alkenyl group which can be selected as $R^1$ to $R^3$ is preferably 8 to 22, more preferably 10 to 20, and still preferably 12 to 18.

The alkyl group may be a linear alkyl group or may be a branched alkyl group.

The alkenyl group may be a linear alkenyl group or may be a branched alkenyl group.

Examples of the primary aliphatic monoamine represented by the general formula (c2-i) include octylamine, laurylamine, stearylamine, and oleylamine.

Examples of the secondary aliphatic monoamine represented by the general formula (2c-ii) include dioctylamine, dilaurylamine, distearylamine, and dioleylamine.

Examples of the tertiary aliphatic monoamine represented by the general formula (2c-iii) include trioctylamine, trilaurylamine, tristearylamine, and trioleylamine.

The amine compound (C2) which is used in one embodiment of the present invention is preferably the primary aliphatic monoamine represented by the general formula (c2-i), and more preferably the primary aliphatic monoamine represented by the general formula (c2-i) wherein $R^1$ is an alkenyl group having 8 to 22 carbon atoms, even more preferably oleylamine.

«Amide Compound (C3)»

Although the amide compound (C3) may be a compound having an amide bond, it is preferably an acid amide resulting from a reaction between a carboxylic acid and an amine, and more preferably a fatty acid amide.

The amide compound (C3) may be used alone or may be used in combination of two or more thereof.

As the carboxylic acid, there is exemplified a linear or branched, saturated or unsaturated monocarboxylic acid. Specifically, examples thereof include a saturated fatty acid, such as heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, and tetracosanoic acid; and an unsaturated fatty acid, such as heptenoic acid, octenoic acid, nonenoic acid, decenoic acid, undecenoic acid, dodecenoic acid, tridecenoic acid, tetradecenoic acid, pentadecenoic acid, hexadecenoic acid, heptadecenoic acid, octadecenoic acid (inclusive of oleic acid), nonadecenoic acid, eicosenoic acid, heneicosenoic acid, docosenoic acid, tricosenoic acid, and tetracosenoic acid.

The saturated fatty acid and the unsaturated fatty acid each may be of a linear chain or a branched chain.

The position of the double bond which the unsaturated fatty acid has is arbitrary.

The carbon number of the carboxylic acid is preferably 7 to 30, more preferably 8 to 24, and still more preferably 10 to 22.

Examples of the amine include an alkylamine, an alkanolamine, and a polyalkylene polyamine.

Examples of the alkylamine include a primary aliphatic alkylamine, such as monomethylamine, monoethylamine, monopropylamine, monobutylamine, monopentylamine, monohexylamine, and monoheptylamine; and a secondary aliphatic alkylamine, such as dimethylamine, methylethylamine, diethylamine, methylpropylamine, ethylpropylamine, dipropylamine, methylbutylamine, ethylbutylamine, propylbutylamine, dibutylamine, dipentylamine, dihexylamine, and diheptylamine.

The alkyl group which the alkylamine has may be either linear or branched.

Examples of the alkanolamine include monomethanolamine, monoethanolamine, monopropanolamine, monobutanolamine, monopentanolamine, monohexanolamine, dimethanolamine, methanolethanolamine, diethanolamine, methanolpropanolamine, ethanolpropanolamine, dipropanolamine, methanolbutanolamine, ethanolbutanolamine, propanolbutanolamine, dibutanolamine, dipentanolamine, and dihexanolamine.

The alkanol group which the alkanolamine has may be either linear or branched.

Examples of the polyalkylenepolyamine include diethylenetriamine, triethylenetetramine, tetraethylenepentamine, pentaethylenehexamine, hexaethyleneheptamine, tetrapropylenepentamine, and hexabutyleneheptamine.

<Other Additive>

The grease composition of one embodiment of the present invention may contain other additive for grease than the component (C) (other additive), which is blended with general greases, within a range where the effects of the present invention are not impaired.

Examples of the other additive for grease include an antioxidant, a rust inhibitor, an extreme pressure agent, a thickening agent, a solid lubricant, a detergent dispersant, a corrosion inhibitor, and a metal deactivator. The other additive may be used alone or may be used in combination of two or more thereof.

Examples of the antioxidant include a phenol-based antioxidant.

Examples of the rust inhibitor include a carboxylic acid-based rust inhibitor, such as an alkenyl succinic acid polyhydric alcohol ester, zinc stearate, thiadiazole and a derivative thereof, and benzotriazole and a derivative thereof.

Examples of the extreme pressure agent include a zinc dialkyl dithiophosphate, amolybdenum dialkyl dithiophosphate, a thiocarbamic acid, such as an ashless dithiocarbamate, zinc dithiocarbamate, and molybdenum dithiocarbamate; a sulfur compound, such as sulfurized fats and oils, a sulfidized olefin, a polysulfide, a thiophosphoric acid, a thioterpene, and a dialkyl thiodipropionate; a phosphoric acid ester, such as tricresyl phosphate; and a phorphorous acid ester, such as triphenyl phosphite.

Examples of the thickening agent include a polymethacrylate (PMA), an olefin copolymer (OCP), a polyalkylstyrene (PAS), and a styrene-diene copolymer (SCP).

Examples of the solid lubricant include a polyimide, PTFE. graphite, a metal oxide, boron nitride, melamine cyanurate (MCA), and molybdenum disulfide.

Examples of the detergent dispersant include an ashless dispersant, such as succinimide and a boron-based succinimide.

Examples of the corrosion inhibitor include a benzotriazole-based compound and a thiazole-based compound.

Examples of the metal deactivator include a benzotriazole-based compound.

In the grease composition of one embodiment of the present invention, though the content of the other additive is appropriately set according to the kind of the additive, it is independently typically 0 to 10% by mass, preferably 0 to 7% by mass, more preferably 0 to 5% by mass, and still more preferably 0 to 2% by mass on a basis of the total amount (100% by mass) of the grease composition.

<Method for Adding Additive>

The grease composition of the present invention can be produced by mixing a grease containing the base oil (A) and the urea-based thickener (B), as produced according to the above-mentioned method, with various additives such as the additive (C). For example, it can be produced by stirring after adding various additives such as the additive (C), or by adding various additives such as the additive (C) with stirring the grease.

<Physical Properties of Grease Composition>

A worked penetration at 25° C. of the grease composition of one embodiment of the present invention is preferably 250 or more, more preferably 270 or more, even more preferably 300 or more, and is preferably 480 or less, more preferably 450 or less, even more preferably 430 or less.

When the worked penetration is 250 or more, wear resistance can be bettered with ease.

In the present specification, the worked penetration of the grease composition means a value measured at 25° C. according to the method D 217 of ASTM.

A dropping point of the grease composition of one embodiment of the present invention is preferably 180° C. or higher, more preferably 220° C. or higher, still more preferably 240° C. or higher, and yet still more preferably 260° C. or higher.

In this specification, the dropping point of the grease composition means a value measured at 25° C. in conformity with JIS K2220 8:2013.

<Use of Grease Composition>

When used for lubrication for lubrication parts such as bearings, slide parts and joint pats of various appliances, the grease composition of the present invention can suitably maintain the kinematic friction force in the lubrication parts, and in addition, the grease composition is excellent in low-temperature torque and can reduce temperature-dependent torque fluctuation, and further can better wear resistance. The grease composition can readily exhibit the effect when used for lubrication for slide parts, and can especially more readily exhibit the effect when used for lubrication for a sliding mechanism of sliding a metal material and a resin material.

The field of devices to which the grease composition is applied is not specifically limited, and examples thereof include devices in an automobile field, an office equipment field, a machine-tool field, a windmill field, and a field for construction or agricultural machine.

Regarding use in an automobile field, for example, the grease composition is applicable to a bearing portion in a device, such as a radiator motor fan, a fan coupling, an alternator, an idler pulley, a hub unit, a water pump, a power window, a wiper, an electric power steering, an electric motor flywheel for driving, a ball joint, a wheel bearing, a spline portion, and a constant-velocity joint; and a bearing portion, a gear portion, or a sliding portion in a device, such as a door lock, a door hinge, and a clutch booster.

Examples of the lubricating portion in the device in the office equipment field include a fixing roll in a device, such as a printer, and a bearing and a gear portion in a device, such as a polygon motor.

Examples of the lubricating portion in the device in the machine-tool field include a bearing portion in a speed reducer of a spindle, a servomotor, a craft robot or the like.

Examples of the lubricating portion in the device in the windmill field include a bearing portion of a blade bearing, an electric generator or the like.

Examples of the lubricating portion in the device in the field for construction or agricultural machine include a bearing portion, a gear portion, and a sliding portion of a ball joint, a spline portion or the like.

[Device]

The device of the present invention is a device having a sliding mechanism of sliding a metal material and a resin material, which is so designed that the grease composition of the present invention mentioned above can be supplied to the sliding surface of the sliding mechanism.

The metal material is preferably various alloys such as steel, stainless alloy or aluminum alloy, or copper. The metal material may be replaced with a material having a high strength (for example, ceramic material).

The resin material may be a natural resin or a synthetic resin, and is preferably general-use plastics (e.g., polyethylene, polystyrene, polypropylene, polyvinyl chloride) or engineering plastics. From the viewpoint of heat resistance and mechanical strength, engineering plastics are more preferred.

Examples of the engineering plastics include synthetic resins such as polyamide resins, polyacetal resins (POM), polycarbonate resins, polysulfone resins, polyphenylene sulfide resins, polyamideimide resins, polyether ether ketone resins, phenol resins, polyester resins, and epoxy resins.

In one embodiment of the device of the present invention, preferably, the sliding mechanism is a ball joint having a metallic ball stud, a housing, and a resin ball sheet arranged between the ball stud and the housing. Having the constitution, the device can suitably maintain the kinematic friction force in the lubrication part, and in addition, the device can be excellent in low-temperature torque and can reduce temperature-dependent torque fluctuation, and further can secure good wear resistance. Accordingly, when used in vehicles, the device of the type can markedly exhibit the effect of maintaining excellent ride quality for long.

In one embodiment of the device of the present invention, the sliding mechanism is a ball bearing having a metallic holder, a metallic roller, and a resin holder. Having the constitution, the device can suitably maintain the kinematic friction force in the lubrication part, and in addition, the device can be excellent in low-temperature torque and can reduce temperature-dependent torque fluctuation, and further can secure good wear resistance. Accordingly, when used in vehicles, the device of the type can markedly exhibit the effect of maintaining excellent ride quality for long.

[Sliding Mechanism Lubrication Method]

In the sliding mechanism lubrication method of the present invention, the grease composition of the present invention mentioned above is applied to the sliding mechanism of sliding a metal material and a resin material.

According to the sliding mechanism lubrication method of the present invention, the kinematic friction force in a lubrication part can be suitably maintained. The effect is described. In the case where the sliding mechanism is a ball joint having a metallic ball stud, a housing, and a resin ball sheet arranged between the ball stud and the housing, the kinematic friction force in the lubrication part can be maintained suitably, and in addition, low-temperature torque is good, time-dependent torque fluctuation can be reduced, and wear resistance can be good. Accordingly, when applied to vehicles, the lubrication method can more markedly exhibit the effect of maintaining excellent ride quality for long. In addition, in the case where the sliding mechanism is an electric power steering having a sliding part composed of a metal material and a resin material, the kinematic friction force in the lubrication part can be maintained suitably, and in addition, low-temperature torque is good, time-dependent torque fluctuation can be reduced, and wear resistance can be good. Accordingly, in the case, the effect of maintaining excellent steering performance can be exhibited markedly.

EXAMPLES

The present invention is hereunder described more specifically with reference to Examples, but it should be construed that the present invention is by no means limited by these Examples.

1. Various Physical Properties

The measurement methods for various physical properties are as follows.

(1) Kinematic Viscosity at 40° C., Kinematic Viscosity at 100° C., and Viscosity Index The measurement and calculation were performed in conformity with JIS K2283:2000.

(2) Worked Penetration

The measurement was performed at 25° C. in conformity with the method

2. Base Oil

The base oil (A) for use in Examples and Comparative Examples was prepared by blending the low-viscosity base oil (A1), the high-viscosity base oil (A2) and the ultrahigh-viscosity base oil (A3) mentioned below, each in an amount described in Table 1.

A1: PAO having a weight-average molecular weight of 555, a kinematic viscosity at 40° C. of 30 mm²/s, a kinematic viscosity at 100° C. of 6 mm²/s, and a viscosity index of 132.

A2: PAO having a weight-average molecular weight of 1400, a kinematic viscosity at 40° C. of 400 mm²/s, a kinematic viscosity at 100° C. of 40 mm²/s, and a viscosity index of 149.

A3: PAO having a weight-average molecular weight of 17,000, a kinematic viscosity at 40° C. of 37,500 mm²/s, a kinematic viscosity at 100° C. of 2,000 mm²/s, and a viscosity index of 300.

3. Synthesis of urea grease and preparation of grease composition

Example 1

(1) Synthesis of Urea Grease

A mixed base oil prepared by blending the base oil (A1) and the base oil (A2) in the ratio in Table 1 (kinematic viscosity at 40° C.: 120 mm²/s, kinematic viscosity at 100° C.: 16 mm²/s, viscosity index: 142) was heated at 70° C. 3 parts by mass of diphenylmethane-4,4'-diisocyanate (MDI) was added to 50 parts by mass of the hot mixed base oil (A) to prepare a solution (x1).

Also 1 part by mass of cyclohexylamine and 3.5 parts by mass of stearylamine were added to 50 parts by mass of a mixed base oil prepared by blending the base oil (A1) and the base oil (A2) in the ratio in Table 1 and heated at 70° C. (kinematic viscosity at 40° C.: 120 mm²/s, kinematic viscosity at 100° C.: 16 mm²/s, viscosity index: 142) to prepare a solution (y1).

Using the grease manufacturing apparatus 1 shown in FIG. 2, the solution (x1) which had been heated at 70° C. was introduced at a flow rate of 150 L/h from the solution introducing pipe 4A into the container body 2, and the solution (y1) which had been heated at 70° C. was simultaneously introduced at a flow rate of 150 L/h from the solution introducing pipe 4B into the container body 2, and the solution (x1) and the solution (y1) were kept continuously introduced into the container body 2 in a state of rotating the rotor 3. The rotation number of the rotator 3 of the grease manufacturing apparatus 1 used was 8000 rpm.

On that occasion, a maximum shear rate (Max) was 10,500 s⁻¹, and stirring was performed by setting a ratio of a maximum shear rate (Max) to a minimum shear rate (Min) [Max/Min] to 3.5.

The urea-based thickener contained in the resultant urea grease corresponds to a compound of the general formula (b1) where $R^1$ and $R^2$ are selected from a cyclohexyl group and a stearyl group (octadecyl group), and $R^3$ is a diphenylmethylene group. The urea-based thickener had $(\alpha+\gamma/2):(\beta+\gamma/2)$ of 60:40, as defined in the specification.

(2) Preparation of Grease Composition

The urea grease obtained in the above (1) (one discharged out from the grease manufacturing apparatus 1 shown in FIG. 2) was heated with stirring at 160° C., and then spontaneously left cooled, and the base oil (A3) and, as additives (C), N-oleylsarcosine (C1), oleylamine (C2) and alkylpolyamide (C3) were added thereto to prepare a grease composition of Example 1.

The content of each component in the grease composition of Example 1 is as shown in Table 1.

Example 2

A mixed base oil prepared by blending the base oil (A1) and the base oil (A2) in the ratio in Table 1 (kinematic viscosity at 40° C.: 140 mm²/s, kinematic viscosity at 100° C.: 18 mm²/s, viscosity index: 143) was heated at 70° C. 3 parts by mass of diphenylmethane-4,4'-diisocyanate (MDI) was added to 50 parts by mass of the hot mixed base oil (A) to prepare a solution (x2).

Also 1 part by mass of cyclohexylamine and 3.5 parts by mass of stearylamine were added to 50 parts by mass of a mixed base oil prepared by blending the base oil (A1) and the base oil (A2) in the ratio in Table 1 and heated at 70° C. (kinematic viscosity at 40° C.: 140 mm²/s, kinematic viscosity at 100° C.: 18 mm²/s, viscosity index: 143) to prepare a solution (y2).

A grease composition of Example 2 was prepared in the same manner as in Example 1 except that the solutions (x1) and (y1) were changed to the solutions (x2) and (y2). The content of each component in the grease composition of Example 2 is as shown in Table 1.

Example 3

A mixed base oil prepared by blending the base oil (A1) and the base oil (A2) in the ratio in Table 1 (kinematic viscosity at 40° C.: 90 mm²/s, kinematic viscosity at 100° C.: 13 mm²/s, viscosity index: 143) was heated at 70° C. 3 parts by mass of diphenylmethane-4,4'-diisocyanate (MDI) was added to 50 parts by mass of the hot mixed base oil (A) to prepare a solution (x3).

Also 1 part by mass of cyclohexylamine and 4 parts by mass of stearylamine were added to 50 parts by mass of a mixed base oil prepared by blending the base oil (A1) and the base oil (A2) in the ratio in Table 1 and heated at 70° C. (kinematic viscosity at 40° C.: 90 mm²/s, kinematic viscosity at 100° C.: 13 mm²/s, viscosity index: 143) to prepare a solution (y3).

A grease composition of Example 3 was prepared in the same manner as in Example 1 except that the solutions (x1) and (y1) were changed to the solutions (x3) and (y3). The content of each component in the grease composition of Example 3 is as shown in Table 1.

Comparative Example 1

A base oil prepared by blending the base oil (A1) in the ratio in Table 1 (kinematic viscosity at 40° C.: 30 mm²/s, kinematic viscosity at 100° C.: 6 mm²/s, viscosity index: 132) was heated at 70° C. 4 parts by mass of diphenylmethane-4,4'-diisocyanate (MDI) was added to 50 parts by mass of the hot base oil (A) to prepare a solution (x4).

Also 1 part by mass of cyclohexylamine and 4 parts by mass of stearylamine were added to 50 parts by mass of a base oil prepared by blending the base oil (A1) in the ratio in Table 1 and heated at 70° C. (kinematic viscosity at 40° C.: 30 mm$^2$/s, kinematic viscosity at 100° C.: 6 mm$^2$/s, viscosity index: 132) to prepare a solution (y4).

A grease composition of Comparative Example 1 was prepared in the same manner as in Example 1 except that the solutions (x1) and (y1) were changed to the solutions (x4) and (y4). The content of each component in the grease composition of Comparative Example 1 is as shown in Table 1.

4. Measurement, Evaluation

Regarding the grease compositions of Examples 1 to 3 and Comparative Example 1, the kinematic viscosity at 40° C. of the base oil extracted from each grease composition and the worked penetration of each grease composition were measured, and the grease compositions were evaluated as follows. In addition, the particles containing the urea-based thickener (B) in the grease compositions of Examples 1 to 3 and Comparative Example 1 were analyzed. The results are shown in Table 1.

4-1. Measurement of Particle Diameter

The grease composition of Examples 1 to 3 and Comparative Example 1 was fully kneaded, then defoamed in vacuum, and filled in a 1-mL syringe. 0.10 to 0.15 mL of the grease composition was extruded out from the syringe, and the extruded grease composition was put on the surface of a tabular cell of a paste cell fixing tool. With that, another tabular cell was put on the grease composition to prepare a measurement cell unit in which the grease composition was sandwiched between the two cells.

Using a laser diffraction particle sizer (trade name: LA-920, by Horiba, Ltd.), an area-based arithmetic average particle diameter of the particles (particles containing the urea-based thickener (B)) in the grease composition in the measurement cell unit was measured. The components (C1) to (C3) used as the additives (C) were all liquid or dissolved in the base oil at room temperature (25° C.), and therefore, these components do not have any influence on the measurement of the particles (particles containing the urea-based thickener (B)) in the grease composition.

Here, "area-based arithmetic average particle diameter" means an arithmetically averaged value of a particle diameter distribution based on an area.

Figure 1:
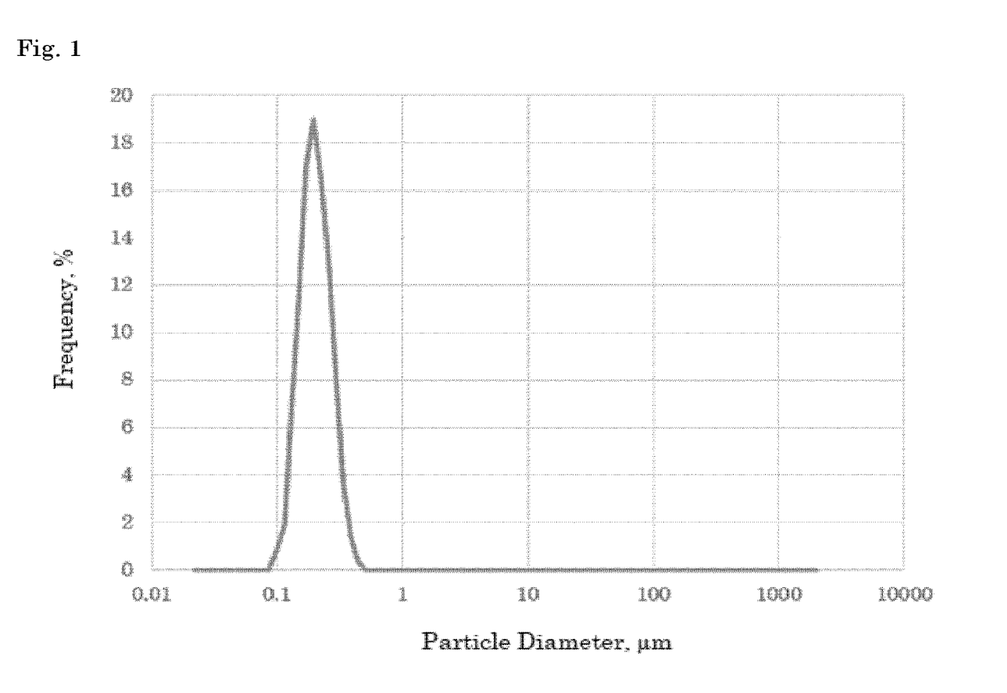
FIG. 1 is an area-based particle diameter distribution curve of the particles in the grease composition produced in Example 1, as measured by a laser diffraction/scattering method.

The area-based particle diameter distribution of the particles in the grease composition of Example 1 is shown in FIG. 1. The area-based particle diameter distribution indicates a particle diameter frequency distribution in all the particles targeted for measurement, based on the area calculated from the particle diameter (in detail, the cross section of the particle having the particle diameter).

An arithmetic average value of the area-based particle size distribution is calculated according to the following expression (1).

$$\text{Arithmetic Average Particle Diameter} = \Sigma\{q(J) \times X(J)\} \div \Sigma\{q(J)\} \quad (1)$$

In the expression (1), J means a division number. q(J) means a frequency distribution value (unit: %). X(J) means a representative diameter (unit: μm) in the Jth particle diameter range.

4-2. Specific Surface Area

Based on the particle diameter distribution obtained by the measurement of 4-1, a specific surface area (unit: cm$^2$/cm$^3$) of the particles (particles containing the urea-based thickener (B)) in the grease composition was calculated.

4-3. Kinematic Friction Force (Average of Kinematic Friction Force)

Using a ball-on-disk type reciprocating wear tester (Bowden Leven type), the kinematic friction force in 20 reciprocations of each sample was measured under the following condition (measurement span: 10 s), and an average value (unit; "N") of the kinematic friction force at each measurement time was calculated.

Disk material: polyacetal (POM)
Ball: SUJ-2 (steel)
Load: 4 kgf
Sliding distance: 10 mm
Number of reciprocations: 20
Speed: 1 mm/s
Temperature: room temperature (25° C.)

4-4. Kinematic Friction Force Fluctuation

Based on the measurement data of the above 4-3, the kinematic friction force fluctuation at each measurement time (standard deviation) was calculated. The unit is "N". As a result, samples having a fluctuation (standard deviation) of less than 0.01 N were ranked "A", those having 0.01 N or more and less than 0.05 N were ranked "B", and those having 0.05 N or more were ranked "C".

4-5. Acoustic Measurement

Using an acoustic measurement instrument exclusive for grease by SKF Corporation (Grease Test Rig BeQuiet+), acoustic measurement was carried out based on the Be Quiet method. The measurement followed the measurement instruction for the instrument. Specifically, using a predetermined deep groove ball bearing (Type 608) at room temperature (about 25° C.), acoustic characteristics were evaluated under a load in the axial direction of 30 N and at a rotation number of 1800 rpm. First, a new bearing not filled with grease was set and, while given a predetermined load, this was rotated at a predetermined rotation number to obtain acoustic data. Next, the same bearing was rotated at a predetermined rotation number while given a predetermined load, grease introduction with air blow was repeated to complete inclusion with grease. Subsequently, this was kept rotated at a predetermined rotation number while still given a predetermined load for acoustic measurement in inclusion with grease to compute BQ grouping according to the program attached to the instrument.

The operation of computing the BQ grouping of every grease composition was repeated for a total of 100 times (10 sets with each one set includes 10 times of computations). Further, based on the proportion as a result of the BQ grouping of 100 times computation, GN grouping was computed. The GN grouping is sectioned into five of GN4, GN3, GN2, GN1 and GNX. GN4 means one giving least noises and having best acoustic characteristics, and GNX means one having the worse acoustic characteristics. Good acoustic characteristics mean that the tested sample can not only suppress noises in slide parts but also suppress vibration, and can be said to secure comfortable ride quality.

TABLE 1

| | | | Example 1 | Example 2 | Example 3 | Comparative Example 1 |
|---|---|---|---|---|---|---|
| Formulation of Grease | Base Oil (A) | Base Oil (A1) | 30.00 | 30.00 | 46.50 | 85.50 |
| | | Base Oil (A2) | 45.00 | 55.00 | 40.00 | — |

TABLE 1-continued

|  |  | Example 1 | Example 2 | Example 3 | Comparative Example 1 |
|---|---|---|---|---|---|
| Composition (part by mass) | Base Oil (A3) | 13.00 | 3.00 | 1.00 | — |
| Urea-Based Thickener (B) | MDI | 3.00 | 3.00 | 3.00 | 4.00 |
|  | Cyclohexylamine | 1.00 | 1.00 | 1.00 | 1.00 |
|  | Stearylamine | 3.50 | 3.50 | 4.00 | 5.00 |
| Additive | Sarcosine Derivative (C1) | 3.00 | 3.00 | 3.00 | 3.00 |
|  | Amine Compound (C2) | 0.50 | 0.50 | 0.50 | 0.50 |
|  | Amide Compound (C3) | 1.00 | 1.00 | 1.00 | 1.00 |
|  | Total | 100.00 | 100.00 | 100.00 | 100.00 |
| Physical Properties | 40° C. Kinematic viscosity of base oil (mm$^2$/s) | 500.00 | 170.00 | 100.00 | 30.00 |
|  | Worked Penetration | 342 | 364 | 310 | 302 |
|  | Arithmetic Average Particle Diameter (μm) | 0.20 | 0.20 | 1.22 | 2.10 |
|  | Specific Surface Area (cm$^2$/cm$^3$) | $3.0 \times 10^5$ | $3.0 \times 10^5$ | $4.9 \times 10^4$ | $2.9 \times 10^4$ |
| Urea Grease Production Method |  | high dispersion | high dispersion | high dispersion | high dispersion |
| Other Evaluation | α + γ/2:β + γ/2 | 60:40 | 60:40 | 60:40 | 60:40 |
|  | Average of Kinematic Friction Force (N) | 1.1 | 1.2 | 1.3 | 1.7 |
|  | Fluctuation of Kinematic Friction Force | A | A | A | C |
|  | Acoustic Characteristics (GN Grouping) | GN3 | GN3 | GN2 | GN1 |

As a result of comparison between Examples 1 to 3 and Comparative Example 1, it is confirmed that the lubricating oil compositions of Examples 1 to 3, where the 40° C. kinematic viscosity of the base oil (A) is 100 mm$^2$/s or more and the area-based arithmetic average particle diameter of the particles containing the urea-based thickener (B) is 2.0 μm or less, can lower kinematic friction force and can reduce kinematic friction force fluctuation. Further, as a result of comparison between Examples 1 and 2 and Example 3, it is confirmed that the lubricating oil compositions of Examples 1 to 2, where the specific surface area of the particles containing the urea-based thickener (B) is 1.0×10$^5$ cm$^2$/cm$^3$ or more, can better acoustic characteristics.

REFERENCE SIGNS LIST

1: Grease manufacturing apparatus
2: Container body
3: Rotor
4: Introduction portion
   4A, 4B: Solution introducing pipe
5: Retention portion
6: First concave-convex portion
7: Second concave-convex portion
8: Discharge portion
9: First concave-convex portion on the side of container body
10: Second concave-convex portion on the side of container body
11: Discharge port
12: Rotation axis
13: First concave-convex portion of rotor
   13A: Concave portion
   13B: Convex portion
14: Second concave-convex portion of rotor
15: Scraper
A1, A2: Gap

The invention claimed is:

1. A grease composition, comprising:
a base oil (A) and a urea-based thickener (B), wherein:
the base oil (A) has a kinematic viscosity at 40° C. of 100 mm$^2$/s or more and 1,000 mm$^2$/s or less,
the base oil (A) is a mixed base oil comprising an ultrahigh-viscosity base oil (A3) having a kinematic viscosity at 40° C. of from 30,000 to 45,000 mm$^2$/s, and particles containing the urea-based thickener (B) in the grease composition satisfy the following requirement (I):
Requirement (I): an area-based arithmetic average particle diameter of the particles is 2.0 μm or less, as measured by a laser diffraction/scattering method.

2. The grease composition of claim 1, wherein the particles containing the urea-based thickener (B) in the grease composition further satisfy the following requirement (II):
Requirement (II): a specific surface area of the particles is 1.0×10$^5$ cm$^2$/cm$^3$ or more, as measured by the laser diffraction/scattering method.

3. The grease composition of claim 1, wherein the kinematic viscosity at 40° C. of the base oil (A) is from 150 to 700 mm$^2$/s.

4. The grease composition of claim 1, wherein the base oil (A) comprises a low-viscosity base oil (A1) having a kinematic viscosity at 40° C. of from 10 to 50 mm$^2$/s and a high-viscosity base oil (A2) having a kinematic viscosity at 40° C. of from 200 to 700 mm$^2$/s.

5. The grease composition of claim 1, wherein the urea-based thickener (B) is a compound of formula (b1):

$$R^1\text{—NHCONH—}R^3\text{—NHCONH—}R^2 \qquad (b1)$$

wherein $R^1$ and $R^2$ each independently represent a monovalent hydrocarbon group having 6 to 24 carbon atoms, and $R^1$ and $R^2$ is optionally the same as or different from each other, and $R^3$ represents a divalent aromatic hydrocarbon group having 6 to 18 carbon atoms.

6. The grease composition of claim 5, wherein the compound of the formula (b1) is a compound (b1-1) where $R^1$ and $R^2$ each are a monovalent linear hydrocarbon group having 6 to 24 carbon atoms, a compound (b1-2) where $R^1$ and $R^2$ each are a monovalent alicyclic hydrocarbon group having 6 to 24 carbon atoms, and a compound (b1-3) where $R^1$ is a monovalent linear hydrocarbon group having 6 to 24 carbon atoms and $R^2$ is a monovalent alicyclic hydrocarbon group having 6 to 24 carbon atoms, wherein:
when a content of the compound (b1-1) is defined as α mol %, a content of the compound (b1-2) is as β mol % and a content of the compound (b1-3) is as γ mol %, (α+γ/2):(β+γ/2) is 80:20 to 50:50.

7. The grease composition of claim 1, comprising the urea-based thickener (B) in an amount of 15% by mass or less based on a total amount of the grease composition.

8. The grease composition of claim 1, further comprising:
at least one additive (C) selected from the group consisting of a sarcosine derivative (C1), an amine compound (C2) and an amide compound (C3).

9. The grease composition of claim 1, having a worked penetration of 250 or more.

10. The grease composition of claim 1, which is suitable for lubrication of a sliding mechanism of sliding a metal material and a resin material.

11. A method for lubricating a sliding mechanism, the method comprising:
adding the grease composition of claim 1 to a sliding mechanism of sliding a metal material and a resin material.

12. A device having a sliding mechanism of sliding a metal material and a resin material, which is so designed that the grease composition of claim 1 is supplied to the sliding surface of the sliding mechanism.

13. The device of claim 12, wherein the sliding mechanism is a ball joint having a metallic ball stud, a housing, and a resin ball sheet arranged between the ball stud and the housing.

* * * * *